Patented Feb. 9, 1932

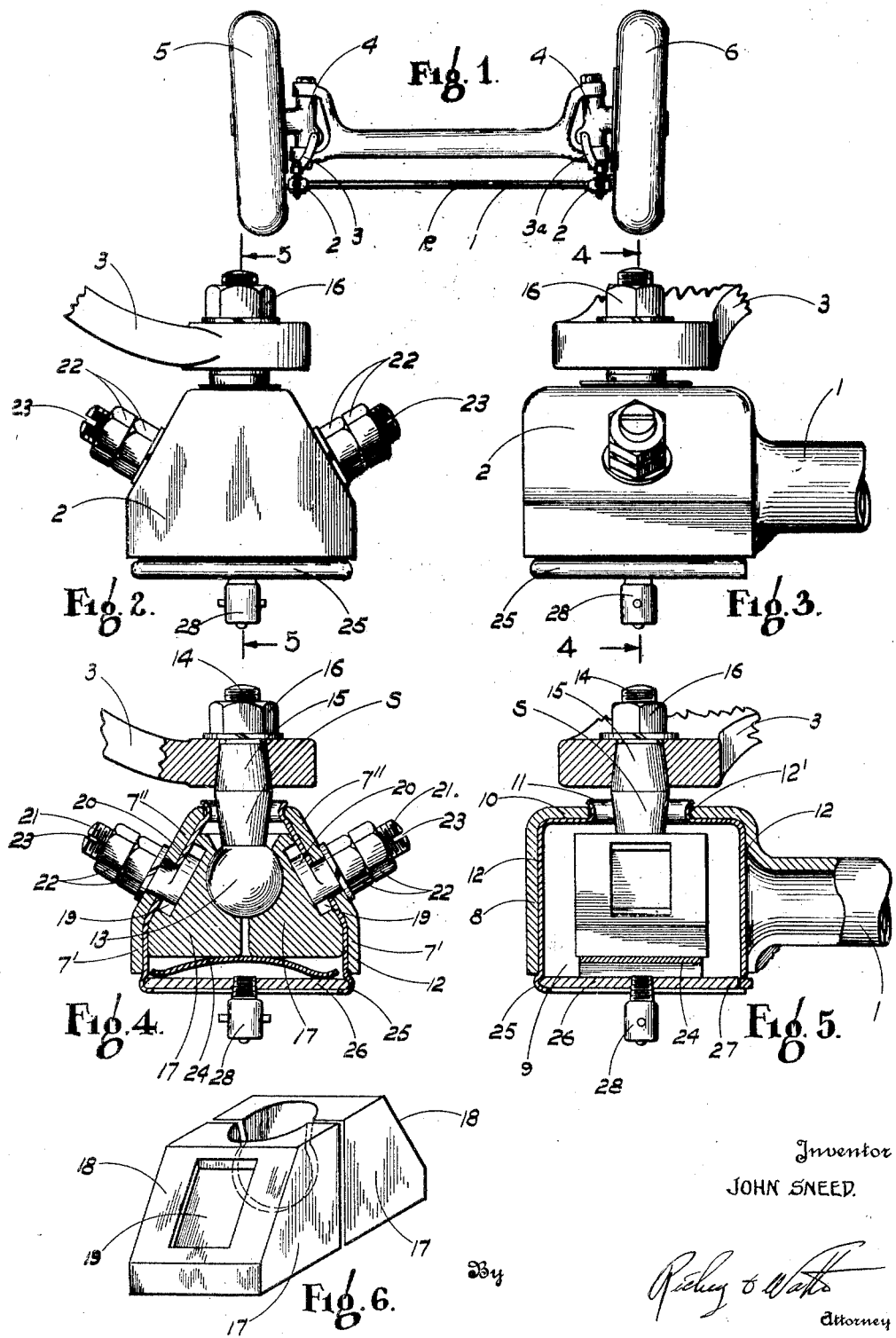

1,844,340

UNITED STATES PATENT OFFICE

JOHN SNEED, OF FERNDALE, MICHIGAN, ASSIGNOR TO THE CINCINNATI BALL CRANK COMPANY, OF CINCINNATI, OHIO, A CORPORATION

TIE ROD

Application filed July 12, 1929. Serial No. 377,725.

This invention relates to links and more particularly to tie rods used in adjustably connecting the steering arms of swiveling wheels of vehicles.

In a common form of automobile steering mechanism one of the front wheels is connected, through suitable linkage, to be turned by movement of the steering wheel. A tie rod extends between this wheel and the other front wheel and causes the wheels to be turned together. The tie rod is universally attached at its ends to arms extending out from the steering knuckles and is preferably adjustable as to length to facilitate adjusting the wheels so that they "toe in" or "to out" the desired amount. When the wheels are set for straight forward movement of the vehicle the ends of the arms to which the tie rod is connected should lie as nearly as possible in a plane passing through the axis of the steering knuckle and extending longitudinally of the vehicle.

For purposes of easy steering the knuckles should be located as close to a plane passing through the greatest diameter of the wheel as possible. In attempting to secure this ideal condition the ends of the above mentioned arms will be brought very close to the body of the wheel particularly where brakes are installed on the front wheels. It is important therefore, that the ends of the tire rod do not extend beyond the point of connection to the end of the arm any further than necessary.

Among the objects of my invention are:

The provision of a link or tie rod adjustable as to its effective length between connecting points.

The provision of a link or tie rod having adjustable end connections which extend outwardly a minimum distance beyond the connecting point.

The provision of a connecting link of rugged construction which may be easily adjusted as to length without detaching from the parts it connects.

The above and other objects of my invention will be evident from the following description reference being had to the accompanying drawings in which:

Figure 1 is a diagrammatic view of the front axle and wheels of a vehicle showing my tie rod in position; Figure 2 is an enlarged end elevation of the tie rod shown in Fig. 1 showing also the end of the arm to which it is connected; Figure 3 is a view taken at right angles to Fig. 2 but looking at the end of the tie rod from the rear; Figure 4 is a section taken on line 4—4 of Fig. 3; Figure 5 is a section taken on line 5—5 of Fig. 2; Figure 6 is a detached perspective view of a pair of split bushings positioned as they are in the ends of the tie rod.

The tie rod R as shown in Fig. 1 has a body portion 1 and cup shaped end portions 2. The ends of the tie rod are attached to the ends of the arms 3 and 3a which are secured to the steering knuckles 4. Thus it will be seen that when the left hand wheel 5 is turned the end of its arm 3 will swing through an arc and, as it is connected to arm 3a by the tie rod R, the arm 3a will swing through a corresponding arc. The right hand wheel 6 will be turned an amount equal to left hand wheel 5.

Due to the angle of the axis of the steering knuckles, the ends of arms 3 and 3a will have a certain amount of vertical movement in addition to their lateral movement. Hence the connections between the tie rod and the ends of the arms 3 and 3a must be capable of allowing at least a limited amount of universal movement between the connected members. This may be provided by a ball and socket joint in which ball studs are supported by the ends of arms 3 and 3a. Sockets for the ball parts of the studs are provided in the ends of the tie rod.

I have shown in the drawings and will describe herein a tie rod having a tubular body portion 2. This may be formed from a sheet metal blank as fully described and claimed in my copending United States patent application Serial No. 293,107 filed July 16, 1928. However any other suitable method of making the body portion and cup shaped ends may be employed and I do not limit my invention to the specific type of the rod shown and described. The cup shaped end portions 2 may be formed integrally with the body portion 1 or may be formed as separate parts and attached thereto.

The cup shaped ends 2 have side walls 7 which have parallel portions 7' and upwardly converging portions 7''. The inner end of the cup portion is adjacent the body 1 of the tie rod and the outer end is closed by the end wall 8. When the tie rod is in position on a vehicle as shown in Figure 1, the cup shaped ends are preferably inverted and the open part 9 of the cup is toward the ground. The relatively closed part 10 of the cup has an elongated aperture 11. This aperture is on top when the link is in operating position.

A sleeve 12 may be stamped or drawn to fit the inside of the cup and may be held in position by flaring the end 12' which extends through the aperture 11. Referring to Figure 4 it will be seen that the ball member 13 of the ball stud has a shank 14 which has a tapered portion 15 which fits in a correspondingly tapered hole in an arm 3 and is held in place by the nut 16. The coacting socket portion of the ball and socket joint is formed by a split bushing made of similar halves 17 each having spherically concave portions in which the ball 13 may be held. The shape of the halves 17 of the split bushing is made to conform to the inside of the sleeve 12 and is best illustrated in Figs. 4 and 6.

The beveled sides 18 of the bushing halves 17 are provided with depressions 19. The cams or eccentrics 20 are mounted on offset shafts 21 and lie in depressions 19 as shown in Fig. 4. These shafts 21 extend through and closely fit holes in the converging portions of the side walls of the sleeve 12 and the cup and are threaded on their outer ends to take the lock nuts 22. Slots 23 are provided in their ends to facilitate adjustment of the position of the split bushings as will be later described.

To hold the split bushings 17 in place a flat spring 24 is provided. This extends across the split between the halves of the bushing and bears against the ends of the bushing halves. Because of the tapered section of the cup and the corresponding walls of the bushing the pressure of spring 24 tends to hold the concave spherical surfaces of the bushing halves 17 in contact with the ball 13 and provides an automatic take up for wear of the ball or bushings.

The sleeve 12 has a groove 25 formed around three sides of its large open end and a cover plate 26 is adapted to be slid into this groove from the open side. A lock for holding the cover plate in position may be provided by depressing the plate near one edge as at 27. This depressed portion is shown in Fig. 5 and acts in combination with the end wall of the sleeve 12, as a spring latch to lock the cover plate in position. In addition to holding the spring 24 in compression the cover plate 26 serves to keep dust and water from the inside of the cup 2 and may be provided with a lubricant fitting 28 by means of which the cup may be filled with grease for lubricating the bushings and the ball and socket joint.

The effective length of tie rod R is the distance between the centers of the concave spherical portion of the split bushings in the cup shaped ends of the rod. By loosening the lock nuts 22 and turning the shafts 21 by means of a screw driver or the like the split bushing halves 17 will be moved longitudinally by the action of the cams 20 in the depressions 19. In Figs. 4 and 5 the bushings are shown in their mid positions and by turning shafts 21 in the proper direction they may be moved either inwardly or outwardly a distance equal to the eccentricity of the cams 20. Thus, as the bushings at each end of the rod are equally adjustable, it is possible to vary the effective length of the tie rod a distance equal to four times the eccentricity of the cams 20. When the lock nuts 22 are tightened the cam 20 will be drawn against the sleeve 12 and held firmly in any desired position.

A tie rod having the above described type of end connections may be easily adjusted while in place on a vehicle by changing the position of the cams 20 or it may be completely removed from the vehicle without disturbing its effective length. The latter is accomplished by removing the nuts 16 whereupon the tie rod, together with the complete adjustable ball and socket end connections, may be removed.

It is to be particularly noted that my tie rod has no adjusting devices or other projections on its ends and the end walls 8 of the cup portion are as close to the connecting points as it is possible to locate them and still allow the desired amount of longitudinal adjustment of the bushings. Thus with this link the ends of the arms 3 and 3a may be brought more nearly into the desired position than is possible with a tie rod having adjusting devices or parts positioned beyond the center of the ball and socket joint.

I have shown and described herein a preferred form of my improved tie rod. It will be evident to those skilled in the art that modifications may be made without departing from the spirit of my invention and I do not wish to limit the scope of this patent other than by the appended claims.

I claim:—

1. A link or tie rod having a body portion and a cup shaped end portion, said cup shaped portion having openings at its top and bottom, side walls tapered inwardly toward the bottom and a closed outside end, a split bushing adapted to be held in said cup shaped portion and independent means for moving the sections of said split bushing longitudinally of said cup toward or away from said body portion.

2. A link or tie rod having a body portion and a split bushing retaining end portion, a split bushing in said end and a cam disposed within said end portion adjacent said split bushing and adapted to be operated from outside of said end portion to move said split bushing toward or away from said body portion.

3. A link or tie rod having a body portion and a split bushing retaining end portion, a split bushing in said end portion, a cam disposed within said end portion adjacent said split bushing and means extending out through the wall of said end portion for operating said cam.

4. An adjustable end for a tie rod or the like comprising a split bushing retaining and guiding cup having parallel ends, sides tapering inwardly and openings at its top and bottom, a two piece split bushing disposed in said cup and tapered on its opposite sides to fit said tapered retaining cup and having slots formed on its tapered surfaces, cams disposed in and coacting with said slots and means extending out through the tapered sides of said retaining cup for operating said cams to cause said split bushing to move toward or away from the tie rod or for holding said cams stationary to prevent movement of said split bushing.

5. The combustion of a link or tie rod having a cup shaped end, oppositely disposed apertures at the top and bottom of said cup, a split bushing in said cup disposed with the split extending longitudinally of the link, a spring adapted to hold said split bushing in said cup, and means extending through the side walls of said cup for moving said split bushing longitudinally of said link.

6. In combination, a steering arm, a ball stud carried thereby, a tie rod having a socket part engaging the ball of said stud, said socket part being movable longitudinally of said tie rod, and means including a bolt with an eccentric head engaging said socket part for moving and holding it relative to said tie rod.

In testimony whereof I hereunto affix my signature this 21st day of June, 1929.

JOHN SNEED.